US008713367B2

(12) United States Patent
Deng et al.

(10) Patent No.: US 8,713,367 B2
(45) Date of Patent: Apr. 29, 2014

(54) APPARATUS AND METHOD FOR RECORDING REBOOT REASON OF EQUIPMENT

(75) Inventors: Xiaoyong Deng, Beijing (CN); Yutian Wang, Beijing (CN)

(73) Assignee: Hangzhou H3C Technologies Co., Ltd., Zhejieng (CN)

( * ) Notice: Subject to any disclaimer, the term of this patent is extended or adjusted under 35 U.S.C. 154(b) by 178 days.

(21) Appl. No.: 13/384,822

(22) PCT Filed: Jan. 25, 2011

(86) PCT No.: PCT/CN2011/070583
§ 371 (c)(1),
(2), (4) Date: Jan. 19, 2012

(87) PCT Pub. No.: WO2011/091743
PCT Pub. Date: Aug. 4, 2011

(65) Prior Publication Data
US 2012/0124362 A1 May 17, 2012

(30) Foreign Application Priority Data
Feb. 1, 2010 (CN) .......................... 2010 1 0104482

(51) Int. Cl.
*G06F 11/00* (2006.01)
(52) U.S. Cl.
USPC .................................. 714/23; 714/24; 714/55
(58) Field of Classification Search
USPC ................................................ 714/23, 24, 55
See application file for complete search history.

(56) References Cited

U.S. PATENT DOCUMENTS

| 6,697,973 B1 * | 2/2004 | Baumeister et al. ............. 714/55 |
| 7,162,666 B2 * | 1/2007 | Bono ............................... 714/51 |
| 7,219,264 B2 * | 5/2007 | Pail et al. ......................... 714/23 |
| 2004/0003317 A1 | 1/2004 | Kwatra et al. |

FOREIGN PATENT DOCUMENTS

| CN | 1632760 | 6/2005 |
| CN | 2824125 | 10/2006 |
| CN | 101286130 | 10/2008 |
| CN | 101556551 | 10/2009 |
| CN | 101873217 | 10/2010 |
| CN | 102141939 | 8/2011 |

OTHER PUBLICATIONS

International Search Report and Written Opinion dated May 5, 2011 issued on PCT Patent Application No. PCT/CN2011/070583 filed Jan. 25, 2011, The State Intellectual Property Office, the P.R. China.

* cited by examiner

*Primary Examiner* — Joshua P Lottich (57) ABSTRACT

Embodiments of the present invention provide an apparatus and a method for recording a reboot reason of equipment. Besides a first watchdog provided for triggering a global reset of the equipment, the apparatus provided by the present invention further includes a second watchdog. The second watchdog is used to trigger a logic chip to record a value representing the reboot reason of power-down in a storage array after the equipment is powered on. Thus, reboot reason of the equipment could recorded as power-down reboot.

19 Claims, 4 Drawing Sheets

APPARATUS AND METHOD FOR RECORDING REBOOT REASON OF EQUIPMENT

BACKGROUND OF THE INVENTION

Equipment may reboot during operation due to some abnormal situations. Generally, reboot reason of equipment includes power-down reboot caused by power-down of the equipment, CPU abnormal reboot caused by the endless loop of software implemented on the CPU, and software reboot caused by the active reboot of software implemented on the CPU.

However, existing equipments may not record the reboot reason accurately. Especially if the reboot is due to power-down ('a power-down reboot'), the power-down event cannot be recorded because the equipment cannot record any information when power-down occurs. Moreover, the equipment cannot, differentiate various reboot reasons and cannot locate the fault of the equipment accurately.

DETAILED DESCRIPTION OF THE INVENTION

Examples will be described in further detail hereinafter with reference to the accompanying drawings.

Figure 1:
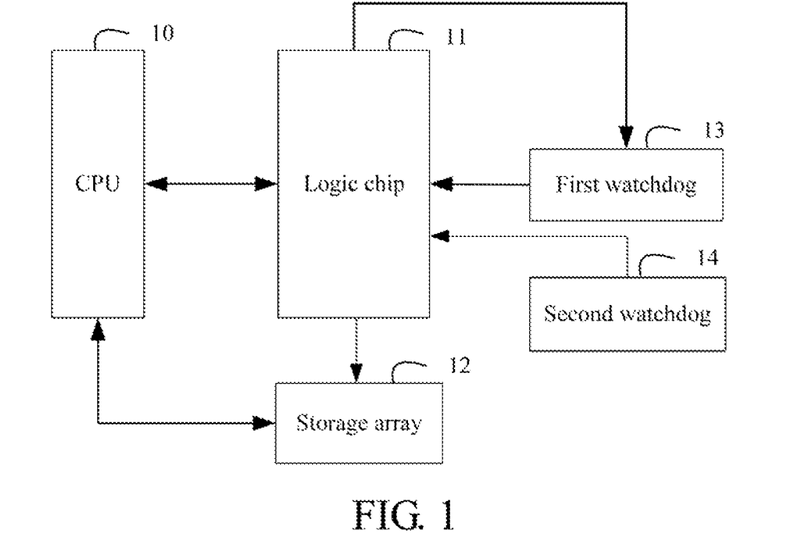
FIG. 1 is a schematic diagram illustrating a structure of an apparatus for recording reboot reason of equipment according to one example.

FIG. 1 is a schematic diagram illustrating an apparatus for recording a reboot reason of equipment according to one example. As shown in FIG. 1, the apparatus includes: a CPU 10, a logic chip 11, a storage array 12, a first watchdog 13 and a second watchdog 14.

The first watchdog 13 is adapted to output a first reset signal to trigger a global reset of the equipment after the equipment has been powered on.

The second watchdog 14 is adapted to output a second reset signal to trigger the logic chip 11 to record a value representing power-down into the storage array 12 after the equipment has been powered on, i.e. the logic chip stores a value in the storage array to indicate that the reboot was due to 'power-down'.

The logic chip 11 is adapted to generate and send a CPU reset signal to the CPU 10 according to the first reset signal, and modify a default value of reboot reason in the storage array 12 to the value representing power-down according to the second reset signal.

The CPU 10 is adapted to reboot according to the CPU reset signal sent by the logic chip 11, read the value representing power-down recorded in the storage array 12 after the reboot, determine the reboot reason of the equipment according to the value read, and configure the value representing power-down recorded in the storage array 12 back to the default value.

Specifically, the storage array 12 may be integrated into the logic chip 11, i.e. the storage array may comprise a logical circuit having memory functions and may be formed inside the logic chip 11 according to a certain logical program. The storage array 12 may be a flip-latch or any other memory logic. Since the logical program in the logic chip 11 will not be lost when power-down occurs, the data in the storage array will not be lost due to power-down.

In addition, the storage array 12 may alternatively be an off-chip storage array outside the logic chip 11.

In practical applications, the logic chip 11 can be a Complex Programmable Logic Device (CPLD) or other types of logic chips.

Hereinafter, the CPLD is taken as an exemplary logic chip to describe the apparatus for recording the reboot reason of equipment.

Figure 2:
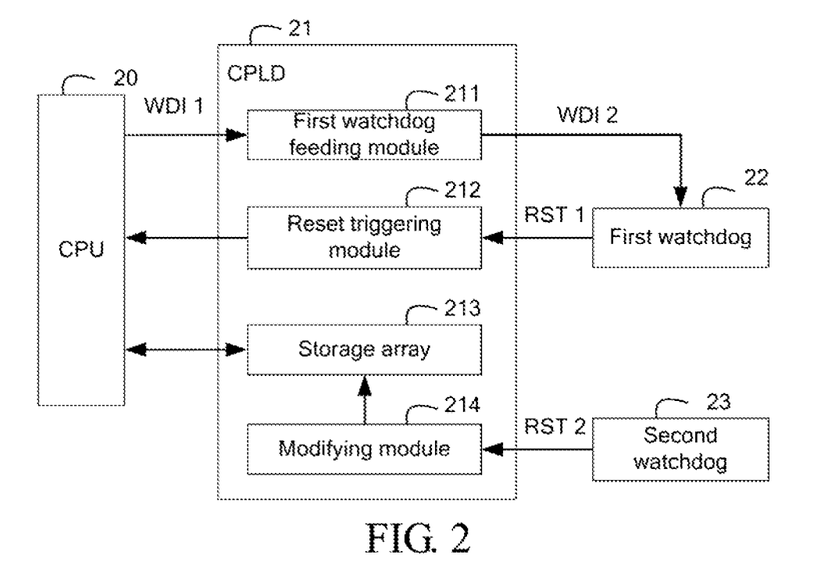
FIG. 2 is a schematic diagram illustrating a logical structure of an apparatus for recording reboot reason of equipment according to one example.

FIG. 2 is a schematic diagram illustrating logical structure of an apparatus for recording a reboot reason of equipment. As shown in FIG. 2, the apparatus includes: a CPU 20, a CPLD 21, a first watchdog 22 and a second watchdog 23.

The CPLD 21 includes a first watchdog feeding module 211, a reset triggering module 212, a storage array 213 and a modifying module 214.

The first watchdog 22 sends a first reset signal RST 1 to the reset triggering module 212 of the CPLD 21 to trigger a global reset of the equipment after the equipment has been powered on.

The reset triggering module 212 receives the first reset signal RST 1 sent by the first watchdog 22, generates a CPU reset signal and outputs it to the CPU 20 to control CPU 20 to execute reboot.

After finishing the reboot, the CPU 20 sends a first watchdog input signal WDI 1 to the first watchdog feeding module 211, so as to make the first watchdog feeding module 211 output the second watchdog input signal WDI 2 to the first watchdog 22, thereby realizing a watchdog feeding operation to the first watchdog 22. Therefore, the first watchdog 22 receives a second watchdog input signal WDI 2 from the first watchdog feeding module 211.

In other words, the CPLD 21 sends the second watchdog input signal WDI 2 to the first watchdog 22 under the control of the CPU 20. That is, the CPU 20 periodically sends the first watchdog input signal WDI 1 to the first watchdog feeding module 211 of the CPLD 21 to clear a time counter of the first watchdog feeding module 211. In case that the time counter of the first watchdog feeding module 211 does not overflow, the first watchdog feeding module 211 periodically sends the second watchdog input signal WDI 2 to the first watchdog 22 to clear a time counter of the first watchdog 22, so that the counter of the first watchdog 22 will not overflow.

The second watchdog 23 outputs, after the equipment is powered on, a second reset signal RST 2 to the CPLD 21 to trigger the modifying module 214 of the CPLD 21 to modify the default value of reboot reason recorded in the storage array 213 to a value representing power-down. Thus, power-down reboot is recorded as the reboot reason of the equipment.

Since the CPLD 21 needs to modify the default value of reboot reason to record the reboot reason of equipment is power-down, enough time is required to ensure that the CPLD 21 is able to record the value under a normal working state after the CPLD 21 is powered on and becomes stable. For example, the first watchdog 22 and the second watchdog 23 may respectively output a pulse of 200 ms after a system power stabilizes. Thus, the CPLD 21 will have enough time to record the value.

In view of the above, the first watchdog 22 outputs the first reset signal to trigger a global reset of the equipment after detecting the equipment is powered on. The second watchdog 23 outputs the second reset signal to trigger the CPLD 21 to modify the default value to the value representing power-down after detecting the equipment is powered on. After each rebooting, the CPU 20 reads the default value of reboot reason in the storage array 213 of the CPLD 21. Due to the default value is modified to the value representing power-down by the CPLD 21, the CPU 20 will read the value representing power-down from the storage array 213, and determine that the reboot reason of the equipment is power-down according to the value read from the storage array 213. Then, the CPU 20 configures the value recorded in the storage array 213 back to the default value. As such, the reboot reason of each subsequent reboot can be recorded by having the default value modified to a value representing reboot reason. The second watchdog 23 performs voltage level detection so as to output the second reset signal RST 2. Therefore, the second watchdog 23 may not need feeding operation.

In this example, the first reset signal RST 1 outputted by the first watchdog 22 is synchronous with (i.e. sent at the same time as) the second reset signal RST 2 outputted by the second watchdog 23. Alternatively, the first reset signal RST 1 outputted by the first watchdog 22 may be later than the second reset signal RST 2.

Besides power-down reboot, the apparatus may also record other reboot reasons such as CPU abnormal reboot and/or software reboot.

Figure 3:
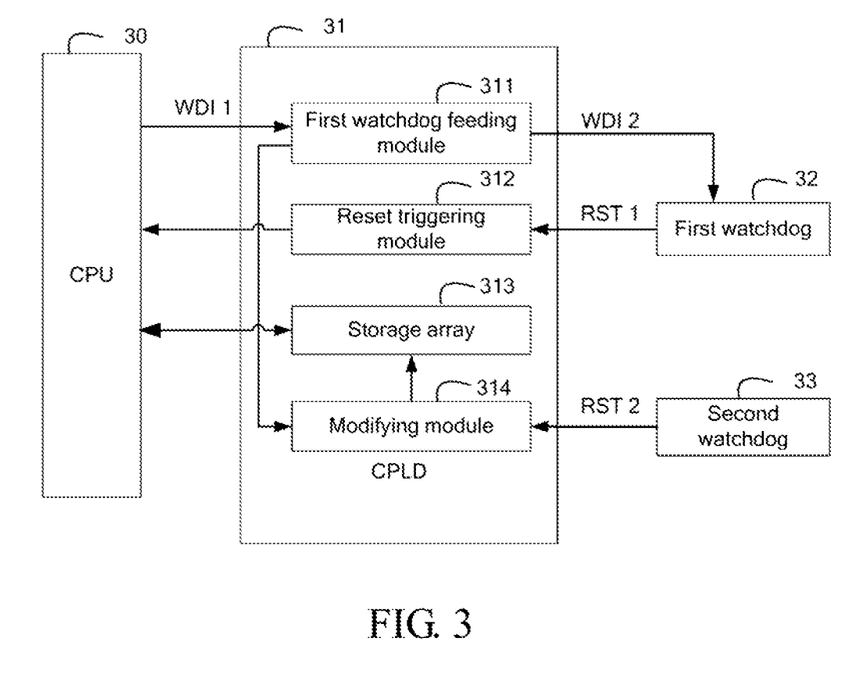
FIG. 3 is a schematic diagram illustrating another logical structure of an apparatus for recording reboot reason of equipment according to one example.

FIG. 3 is a schematic diagram illustrating logical structure of an apparatus for recording a reboot reason of equipment according to one example. As shown in FIG. 3, the apparatus in this example includes: a CPU 30, a CPLD 31, a first watchdog 32 and a second watchdog 33, wherein the CPLD 31 includes a first watchdog feeding module 311, a reset triggering module 312, a storage array 313 and a modifying module 314.

When the CPU 30 is operating in its normal operating status, the CPU 30 periodically sends a first watchdog input signal WDI 1 to the first watchdog feeding module 311 of the CPLD 31 to clear a time counter of the first watchdog feeding module 311. The first watchdog feeding module 311 receives the first watchdog input signal WDI 1 from the CPU 30. Thus, the time counter of the first watchdog feeding module 311 is cleared periodically. However, when the CPU 30 is in an abnormal state (e.g. an endless loop of software implemented on the CPU will result in the CPU being in an abnormal state), it stops sending the first watchdog input signal WDI 1 to the first watchdog feeding module 311. Moreover, when the count value of the time counter of the first watchdog feeding module 311 reaches a first threshold, the first watchdog feeding module 311 triggers the modifying module 314 of the CPLD 31 to modify the default value of reboot reason of the equipment recorded in the storage array 313 to a value representing CPU abnormal. The modifying module 314 modifies the default value to the value representing CPU abnormal. Thus, CPU abnormal reboot is recorded as the reboot reason of the equipment. When the count value of the counter of the first watchdog feeding module 311 reaches a second threshold and thus the counter overflows, the first watchdog feeding module 311 stops sending the second watchdog input signal WDI 2 to the first watchdog 32.

It can be seen from the above description that, the first threshold used for triggering the modification of the default value recorded in the storage array 313 is less than and close to the second threshold, which is the overflow threshold of the counter of the first watchdog feeding module 311. Thus, before the first watchdog feeding module 311 stops sending the second watchdog input signal WDI 2 to the first watchdog 32, the first watchdog feeding module 311 will firstly trigger the modifying module 314 to record the value representing CPU abnormal into the storage array 313.

For example, the first threshold could be 28 s and the second threshold could be 30 s. The count value of the counter of the first watchdog feeding module 311 will be incremented by one [1] every second. When the count value of the counter reaches 28 s, the first watchdog feeding module 311 triggers the modifying module 314 to modify the default value of reboot reason of the equipment recorded in the storage array 313. When the count value of the counter reaches 30 s, the counter of the first watchdog feeding module 311 overflows, i.e. the overflow time is 30 s. Therefore, if the first watchdog feeding module 311 does not receive the first watchdog input signal WDI 1 from the CPU 30 within 28 s, the first watchdog feeding module 311 triggers the modifying module 314 to modify the default value of reboot reason recorded in the storage array 313. When the first watchdog feeding module 311 does not receive the first watchdog input signal WDI 1 within 30 s, the first watchdog feeding module 311 stops sending the second watchdog input signal WDI 2 to the first watchdog 32.

After the equipment is powered on, the first watchdog 32 sends a first reset signal RST 1 to the reset triggering module 312 of the CPLD 31 to trigger the global reset of the equipment and receives the second watchdog input signal WDI 2 from the first watchdog feeding module 311. When the first watchdog 32 does not receive the second watchdog input signal WDI 2 within its overflow time, it will overflow and output the first reset signal RST 1 to the reset triggering module 312 as well.

The reset triggering module 312 receives the first reset signal RST 1 from the first watchdog 32, generates and outputs a CPU reset signal to the CPU 30 to reboot the CPU 30.

After each rebooting, the CPU 30 reads the default value of reboot reason in the storage array 313 of the CPLD 31. Due to the default value is modified to the value representing CPU abnormal by the CPLD 31, the CPU 20 will read the value representing CPU abnormal from the storage array 313 after completing the reboot, and determines that the reboot reason of equipment is CPU abnormal according to the value read from the storage array 313. Then the CPU 30 configures the value representing CPU abnormal recorded in the storage array 313 back to the default value.

Functions of other parts or modules in FIG. 3 are similar with those corresponding devices or modules in FIG. 2 and will not be described repeatedly herein.

In addition, the apparatus shown in FIG. 3 may be further used for recognizing a reboot reason of software reboot. At this time, the CPU 30 further bears software, which can start a reboot actively. The CPU 30 will reboot due to active reboot of the software. Since the time of CPU reboot is short, and the time of modifying the default value stored in the storage array is close to the overflow time of the counter of the first watchdog feeding module 311, therefore the time of CPU reboot is less than the first threshold. After rebooting, the CPU 30 will continue to send the first watchdog feeding signal to the first watchdog feeding module 311 before the default value is modified. The first watchdog feeding module 311 will not trigger the modifying module 314 to modify the default value recorded in the storage array 313. After rebooting, the CPU 30 would read the default value from the storage array 313 and determine that the reboot reason of the equipment is software reboot according to the default value.

Thus, besides the power-down reboot, the apparatus provided by the embodiments of the present invention could further record other reboot reasons such as CPU abnormal reboot and/or software reboot. Furthermore, it is possible to differentiate various reboot reasons accurately, so as to locate the fault of the equipment accurately.

As to the situation that multiple reboot reasons are required to be recorded, the storage array in the CPLD of the present invention may be a register, which can store at least 2 bits. Take a register with width of 2 bits as an example. Suppose the default value of the 2 bits of the register is "11".

After the equipment is powered on, the second watchdog triggers the modifying module of the CPLD to set the default value "11" in the register to zero. Thus, the value in the register is "00", which is used for representing power-down reboot.

When the time that the CPU does not send the first watchdog input signal to the first watchdog feeding module of the CPLD reaches the first threshold, the modifying module of the CPLD sets the default value "11" to "10". Thus, the value stored in the register is "10", which is used for representing CPU abnormal reboot.

When the CPU reboots due to the active reboot of software on the CPU, the default value "11" used for representing the default value of reboot reason stored in the register of the storage array will not be changed. In such way, the reboot reason of the equipment would be record as software reboot and the CPU can determine the reboot reason is software reboot according to the default value read from the register.

Figure 4:
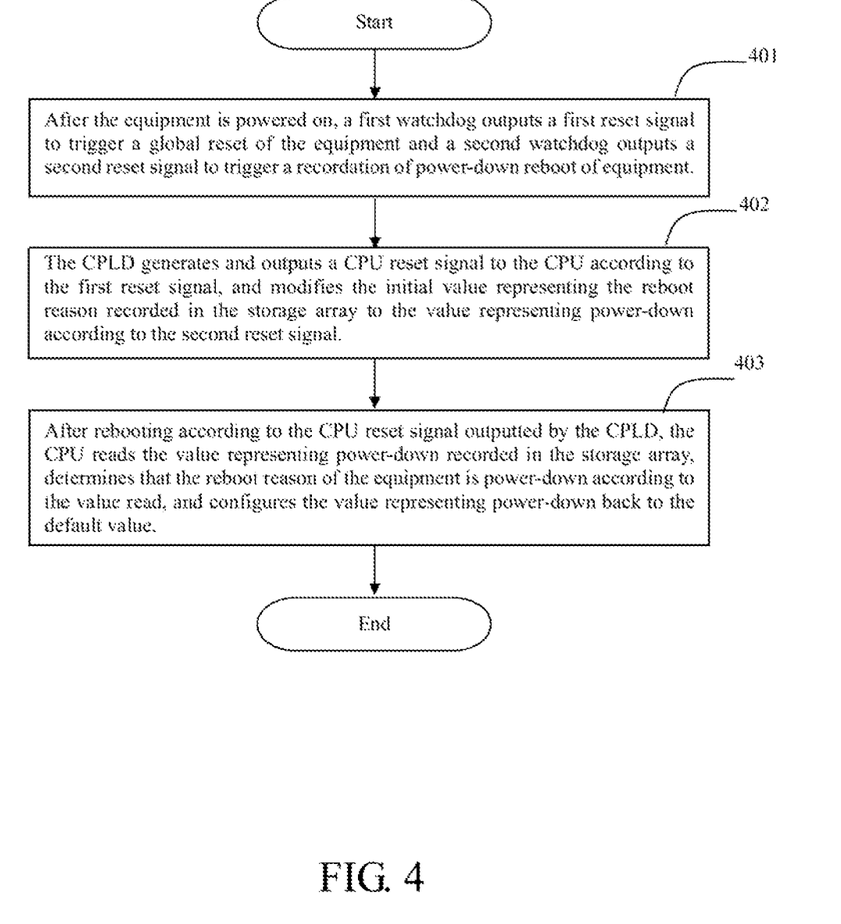
FIG. 4 is a flowchart illustrating a method for recording reboot reason of equipment according to one example.

The above described apparatus can implement a method for recording a reboot reason of equipment. As shown in FIG. 4, the method includes:

Step 401, after the equipment is powered on, a first watchdog outputs a first reset signal to trigger a global reset of the equipment and a second watchdog outputs a second reset signal to trigger a recordation of power-down reboot of equipment.

Step 402, the CPLD receives the first reset signal and the second reset signal, generates and outputs a CPU reset signal to the CPU according to the first reset signal received from the first watchdog, and modifies a default value of reboot reason recorded in the storage array to the value representing power-down according to the second reset signal received from the first watchdog.

Step 403, after rebooting according to the CPU reset signal outputted by the CPLD, the CPU reads the value representing power-down recorded in the storage array, determines that the reboot reason of the equipment is power-down according to the value read, and configures the value representing power-down back to the default value.

After each rebooting, the CPU reads the default value of reboot reason in the IS storage array. Because the default value is modified to the value representing power-down by the CPLD; the CPU will read the value representing power-down from the storage array and determine that the reboot reason of the equipment is power-down according to the value representing power down. Then, the CPU 20 configures the value recorded in the storage array back to the default value.

Figure 5:
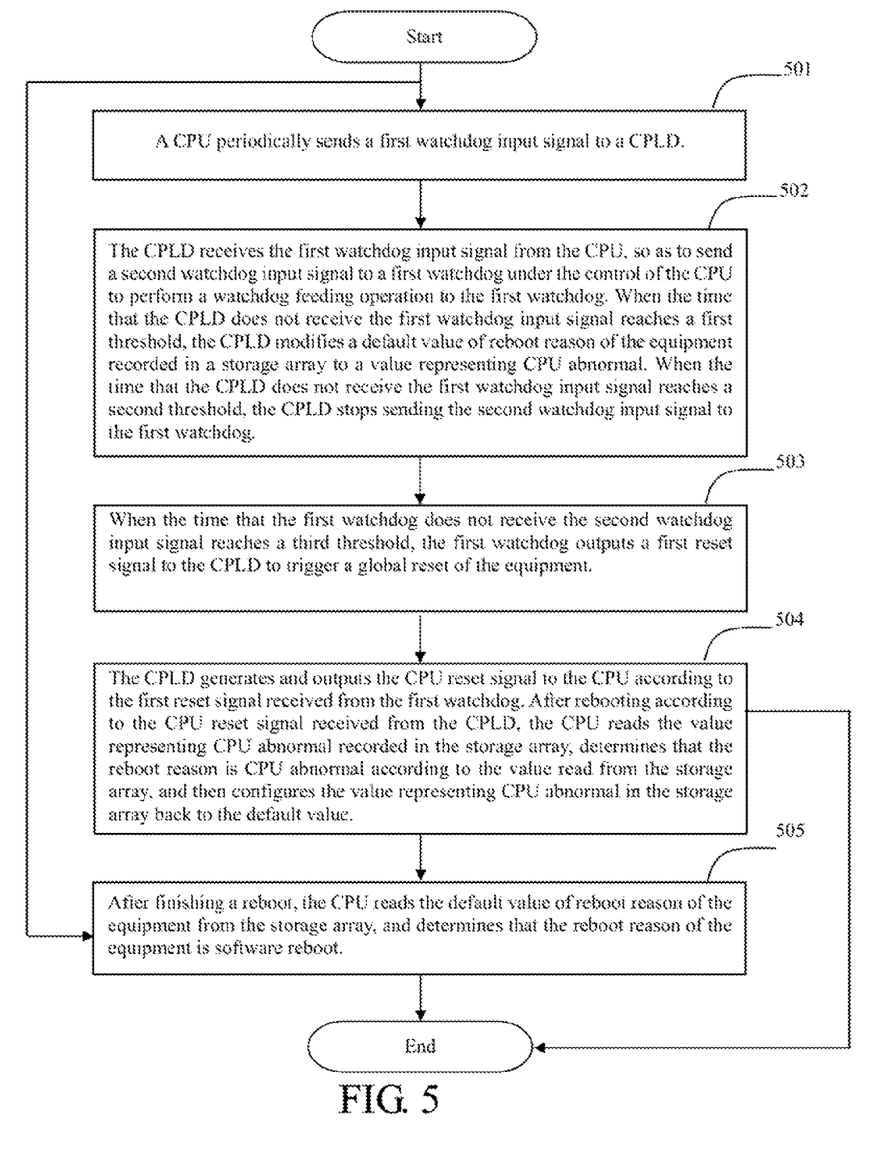
FIG. 5 is a flowchart illustrating a method for recording reboot reason of equipment according to another one example.

Besides the power-down reboot, certain equipment may further record and recognize a CPU abnormal reboot and/or a software reboot. FIG. 5 is a flowchart illustrating a method for recording a reboot reason of equipment according example. As shown in FIG. 5, the method includes:

Step 501, a CPU periodically sends a first watchdog input signal to a CPLD.

Step 502, the CPLD receives the first watchdog input signal from the CPU, so as to send a second watchdog input signal to a first watchdog under the control of the CPU to perform a watchdog feeding operation to the first watchdog. When the time that the CPLD does not receive the first watchdog input signal reaches a first threshold, the CPLD modifies a default value of reboot reason of the equipment recorded in a storage array to a value representing CPU abnormal. When the time that the CPLD does not receive the first watchdog input signal reaches a second threshold, the CPLD stops sending the second watchdog input signal to the first watchdog.

Step 503, when the time that the first watchdog does not receive the second watchdog input signal reaches a third threshold, the first watchdog outputs a first reset signal to the CPLD to trigger a global reset of the equipment.

Step 504, the CPLD generates and outputs the CPU reset signal to the CPU according to the first reset signal received from the first watchdog. After rebooting according to the CPU reset signal received from the CPLD, the CPU reads the value representing CPU abnormal recorded in the storage array, determines that the reboot reason is CPU abnormal according to the value read from the storage array, and then configures the value representing CPU abnormal in the storage array back to the default value.

After each rebooting, the CPU would read the default value of reboot reason in the storage array. Due to the default value is modified to the value representing CPU abnormal by the CPLD; the CPU would read the value representing power-down from the storage array, and determine that the reboot reason of the equipment is power-down according to the value representing CPU abnormal. Then, the CPU 20 configures the value recorded in the storage array back to the default value.

Step 505, when the CPU finishes a reboot caused by an active reboot of software on the CPU, the CPU reads the default value of reboot reason of the equipment from the storage array, and determines that the reboot reason is of the equipment is software reboot according to the default value of reboot reason.

Since the CPU bears the software, which may reboot actively and result in the reboot of the CPU, through the above step 505, the method provided by the embodiment of the invention is able to further record and recognize the software reboot event.

The above examples may be implemented by hardware or by software together with a necessary hardware platform. For example, a software product which is stored in nonvolatile storage medium (e.g. CD-ROM, USB flash disk, portable hard disk, etc.) and includes a set of instructions used for enabling a computer apparatus (e.g. a personal computer, a server, or a network apparatus, etc.) to perform the method described in one or more of the above examples.

The invention claimed is:

1. An apparatus comprising:
   a CPU, a first watchdog, a second watchdog, a logic chip, and a storage array to record a value representing a reboot reason for an equipment;
   wherein the first watchdog is to output a first reset signal to the logic chip in response to the equipment being powered on;
   wherein the second watchdog is to output a second reset signal to the logic chip in response to the equipment being powered on;
   in response to receiving the first reset signal, the logic chip is to generate and output a CPU reset signal to the CPU, and
   in response to receiving the second reset signal, the logic chip is to replace a default value of the reboot reason recorded in the storage array to a power-down value representing power-down of the equipment.

2. The apparatus of claim 1, wherein the CPU is to:
reboot in response to receiving the CPU reset signal outputted by the logic chip;
read the reboot reason value recorded in the storage array after the reboot;
determine that the equipment was rebooted based on a power-down of the equipment according to the reboot reason value read from the storage array; and
set the reboot reason value in the storage array to the default value.

3. The apparatus of claim 1, wherein the first reset signal generated by the first watchdog is synchronous with the second reset signal generated by the second watchdog.

4. The apparatus of claim 1, wherein the first reset signal generated by the first watchdog is outputted after the second reset signal is outputted by the second watchdog.

5. The apparatus of claim 1 wherein the logic chip is further to:
determine whether a first watchdog input signal is received from the CPU;
perform a watchdog feeding operation in response to receiving the first watchdog input signal; and
in response to the watchdog feeding operation, send an input signal to the first watchdog.

6. The apparatus of claim 5, wherein in response to not receiving the first watchdog input signal from the CPU after a first predetermined amount of time,
the logic chip is to replace the default value of the reboot reason value to a value representing an abnormal CPU state and in response to not receiving the first watchdog input signal from the CPU after a second predetermined amount of time, the logic chip is to stop sending the input signal to the first watchdog; and
in response to the first watchdog not receiving the input signal from the logic chip after a third predetermined amount of time, the first watchdog is to output the first reset signal to the logic chip to cause the logic chip to generate and output the CPU reset signal to the CPU.

7. The apparatus of claim 6, wherein the CPU is to
reboot upon receiving the CPU reset signal,
read the reboot reason value recorded in the storage array after the reboot,
determine, based on the reboot reason value, that the reboot reason of the equipment is that the CPU was in an abnormal state, and
set the reboot reason value to the default value.

8. The apparatus of claims 1, wherein the CPU is to:
read the reboot reason value recorded in the storage array after a reboot of the CPU; and
in response to reading that the reboot reason value is the default value, determine that the reboot reason is a software reboot by the CPU.

9. A method for recording a reboot reason of equipment, comprising:
receiving a first reset signal outputted by a first watchdog after the equipment is powered on;
receiving a second reset signal outputted by a second watchdog after the equipment is powered on;
generating and outputting a CPU reset signal to a CPU in response to receiving the first reset signal; and
in response to receiving the second reset signal, replacing a default value of a reboot reason value recorded in a storage array to a value representing a power-down reboot of the equipment.

10. The method of claim 9, wherein the first reset signal is received either synchronously with the second reset signal, or later than the second reset signal.

11. The method of claim 9, further comprising:
receiving a first watchdog input signal sent by the CPU;
sending a second watchdog input signal to the first watchdog to perform a watchdog feeding operation to the first watchdog based on the first watchdog input signal;
setting the reboot reason value recorded in the storage array to a value representing a CPU abnormal state when the first watchdog input signal is not received within a first elapsed time threshold; and
stopping the sending of the second watchdog input signal to the first watchdog when the first watchdog input signal is not received within a second elapsed time threshold,
wherein, the first watchdog outputs the first reset signal when the first watchdog does not receive the second watchdog input signal within a third elapsed time threshold.

12. The method of claim 11,
wherein the CPU reboots in response to receipt of the CPU reset signal, reads the reboot reason value recorded in the storage array after executing the reboot, determines the reboot reason of the equipment is that the CPU was in an abnormal state based upon the reboot reason value read from the storage array, and sets the reboot reason value in the storage array to the default value.

13. The method of claim 9, further comprising determining the reboot reason of the equipment is a software reboot by the CPU in response to determining that the reboot reason value read from the storage array is the default value after the CPU finishes a reboot caused by active reboot of software on the CPU.

14. The method of claim 9, further comprising:
rebooting the CPU in response to the CPU receiving the CPU reset signal;
reading, by the CPU after rebooting, the reboot reason recorded in the storage array;
determining, by the CPU, the reboot reason of the equipment based upon the reboot reason value read from the storage array; and
setting the reboot reason value in the storage array to the default value.

15. A non-transitory computer-readable storage medium, comprising machine-readable instructions that, when executed by a computer, cause the computer to:
receive a first reset signal outputted by a first watchdog after an equipment is powered on;
receive a second reset signal outputted by a second watchdog after the equipment is powered on;
generate and output a CPU reset signal to a CPU in response to receipt of the first reset signal; and
in response to receipt of the second reset signal, replace a default value of a reboot reason value recorded in a storage array to a value representing a power-down reboot of the equipment.

16. The non-transitory computer-readable storage medium of claim 15, wherein the machine-readable instructions are to further cause the computer to:
receive a first watchdog input signal sent by the CPU;
send a second watchdog input signal to the first watchdog to perform a watchdog feeding operation to the first watchdog in response to the first watchdog input signal;

set the reboot reason value recorded in the storage array to a value representing a CPU abnormal state when the first watchdog input signal is not received within a first elapsed time threshold; and discontinue the second watchdog input signal to the first watchdog when the first watchdog input signal is not received within a second elapsed time threshold, wherein the first watchdog outputs the first reset signal when the first watchdog does not receive the second watchdog input signal within a third elapsed time threshold.

17. The non-transitory computer-readable storage medium of claim 16, wherein the machine-readable instructions are to further cause the computer to:

reboot the CPU in response to receipt of the CPU reset signal;

read the reboot reason value recorded in the storage array after the reboot;

determine a reboot reason of the equipment is an abnormal CPU state based upon the reboot reason value read from the storage array; and set the reboot reason value in the storage array to the default value.

18. The non-transitory computer-readable storage medium of claim 16, wherein the machine-readable instructions are to further cause the computer to:

determine a reboot reason of the equipment is a software reboot by the CPU in response to a determination that the reboot reason value read from the storage array is the default value.

19. The non-transitory computer-readable storage medium of claim 16, wherein the machine-readable instructions are to further cause the computer to:

reboot the CPU in response to the CPU receiving the CPU reset signal;

read after rebooting, the reboot reason value recorded in the storage array;

determine a reboot reason of the equipment based upon the reboot reason value read from the storage array; and set the reboot reason value in the storage array to the default value.

* * * * *

UNITED STATES PATENT AND TRADEMARK OFFICE
CERTIFICATE OF CORRECTION

PATENT NO. : 8,713,367 B2  
APPLICATION NO. : 13/384822  
DATED : April 29, 2014  
INVENTOR(S) : Xiaoyong Deng et al.

Page 1 of 1

It is certified that error appears in the above-identified patent and that said Letters Patent is hereby corrected as shown below:

In the Claims:

In column 7, line 33, in Claim 6, delete "state" and insert -- state. --, therefor.

In column 7, line 50, in Claim 8, delete "claims" and insert -- claim --, therefor.

Signed and Sealed this  
Fifth Day of August, 2014

Michelle K. Lee  
*Deputy Director of the United States Patent and Trademark Office*